United States Patent [19]

Wheeler et al.

[11] Patent Number: 5,200,993
[45] Date of Patent: Apr. 6, 1993

[54] PUBLIC TELEPHONE NETWORK INCLUDING A DISTRIBUTED IMAGING SYSTEM

[75] Inventors: Barbara L. Wheeler, Springfield; Earnest L. Heatwole, Jr., Fairfax, both of Va.; Maureen T. McGinley, Philadelphia, Pa.; Richard M. Seikaly, Falls Church, Va.

[73] Assignee: Bell Atlantic Network Services, Inc., Arlington, Va.

[21] Appl. No.: 698,212

[22] Filed: May 10, 1991

[51] Int. Cl.⁵ ............................................. H04M 11/00
[52] U.S. Cl. ..................................... 379/96; 379/100; 358/442
[58] Field of Search ...................... 379/94–98, 379/100, 112–114, 118, 127, 105; 358/400, 402, 403, 407, 442, 85, 86

[56] References Cited

U.S. PATENT DOCUMENTS

| | | |
|---|---|---|
| 4,491,873 | 1/1985 | Takayama . |
| 4,506,111 | 3/1985 | Takenouchi et al. . |
| 4,523,055 | 6/1985 | Hohl et al. . |
| 4,573,083 | 2/1986 | Shimizu . |
| 4,713,780 | 12/1987 | Schultz et al. . |
| 4,852,154 | 7/1989 | Lewis et al. ................ 379/105 |
| 4,893,333 | 1/1990 | Baran et al. . |
| 4,914,586 | 4/1990 | Swinehart et al. . |
| 4,918,722 | 4/1990 | Duehren et al. . |
| 4,922,348 | 5/1990 | Gillon et al. . |
| 4,932,042 | 6/1990 | Baral et al. . |
| 4,935,955 | 6/1990 | Neudorfer . |
| 4,941,170 | 7/1990 | Herbst . |
| 4,969,184 | 11/1990 | Gordon et al. . |
| 4,972,462 | 11/1990 | Shibata . |
| 4,974,254 | 11/1990 | Perine et al. . |
| 4,985,919 | 1/1991 | Naruse et al. ................ 379/95 |
| 5,008,926 | 4/1991 | Misholi ................ 379/100 |
| 5,046,088 | 9/1991 | Margulies ................ 379/211 |
| 5,068,745 | 11/1991 | Shimura ................ 358/403 |
| 5,068,888 | 11/1991 | Scherk et al. ................ 379/100 |

FOREIGN PATENT DOCUMENTS

| | | | |
|---|---|---|---|
| 2211698 | 7/1989 | United Kingdom ............ 379/98 |
| 9101608 | 2/1991 | World Int. Prop. O. ......... 379/100 |

OTHER PUBLICATIONS

Chorus Data Systems, New Product Information, Mar. 21, 1988, pp. 1, 2.
"Hitachi Gives 'High Five' to Himail 20F", Oct. 1988, vol. 2, No. 10, p. 5, Buyers Laboratory, Facsimile Machines, 20 Railroad Ave., Hackensack, N.J.
L. A. Business Systems CAN-FAX, Buyers Laboratories, Inc., Fax Reporter, Dec. 1988, vol. 2, pp. 3–5.

Primary Examiner—James L. Dwyer
Assistant Examiner—Wing F. Chan
Attorney, Agent, or Firm—Lowe, Price, LeBlanc & Becker

[57] ABSTRACT

A public telephone network includes enhanced capabilities with a distributed imaging system. The imaging system interfaces with end users through appropriate bridges, routers and gateways to provide the user with a virtual local area network. Automatic number information (ANI) is used to automatically configure the system as required by the user. A central processing system performs text and image manipulation and transmission functions using the switched network facilities. Routing tables stored by the imaging system support automatic image and document routing functions.

7 Claims, 2 Drawing Sheets

PUBLIC TELEPHONE NETWORK INCLUDING A DISTRIBUTED IMAGING SYSTEM

TECHNICAL FIELD

The invention relates to enhanced functionality of a public telephone network and, in particular, to a distributed imaging system with a plurality of input/output nodes connected by a public telephone network to central or distributed image data processing and storage facilities.

BACKGROUND ART

In major industrial countries significant resources are dedicated to creating, processing and distributing information. To best utilize these assets, research has been directed toward information management efforts including how to best present the information to enhance its utilization. To this end, various systems have been proposed for providing high quality transmission of images with and without supporting text.

Technological support for information distribution has produced electronic systems for creating, compiling, editing, storing, accessing, and distributing high resolution image information. These technologies are directed to producing and/or supporting a paperless work environment wherein data is transmitted electronically over dedicated and public networks. As communications capabilities for the transmission of data have been enhanced by modern technologies, the forms of information transmitted have correspondingly grown.

Initial attempts at electronic information transfer were limited to the bilevel signaling of a single channel American Morse signal, followed by more sophisticated modulation techniques supporting analog speech, low and medium resolution facsimile images, digital data and slow and fast scan television signals.

Image management systems offer high resolution digital image data using computer workstations. The workstations include powerful processors, large memories and high resolution bit-mapped displays providing 1,200 by 900 pixels (picture elements) or greater display resolution. Information for each pixel includes multiple level bit intensity information to create various shades of a gray scale and may include pixel color information. For example, by representing each pixel by 8 bits of intensity data, 256 intensity levels can be displayed. Bit color information can be stored as separate intensity levels for each of the primary colors, red, green and blue. Using windowing techniques, multiple images can be concurrently displayed on a monitor.

In a multi-media, multi-source information retrieval system, both textual and image data is made avaiable to a system user on a display and/or hard-copy printing device. Multi-media workstations combine high resolution images with supporting text, data and other media including video while separately maintaining the underlying image and text data. Images are typically stored as bit-mapped data described above and text as string data is stored using conventional encoding standards such as ASCII.

Textual information provided to a user is available from several sources including other users, private and commercial data bases, and automated electronic information services. High resolution image data is available from similar sources and may include medical imaging data, photographic images, electronic graphics, frame grabber television pictures, etc. The original input image data can be manipulated and combined with other displayable data including other images and text to form "composite" image data.

Duehran et al U.S. Pat. No. 4,918,722 describes a method for sending a selected message comprising binary encoded character data or facsimile encoded data stored at a first location to any specified remote location accessible from the first location via the public switched telephone network. The method includes the steps of storing the messages at the first location and thereafter receiving at the first location via the public switched telephone network, delivery commands issued by any remote telephone device identifying the selected message and specified remote location. The commands are decoded to identify the selected message and specified remote location and the selected message is recovered from the stored messages. A telephone call is initiated to the specified remote location and sent to a facsimile capable receiving device at the specified remote location via the public switched telephone network in a facsimile compatible form.

Gordon et al. U.S. Pat. No. 4,969,184 is directed to facsimile message transmission between end devices via a public switched telephone network and a "process intermediary unit." The purpose of this arrangement is to eliminate the need for the subscriber at the destination to have a dedicated telephone line while giving the appearance at the originating device of dedicated line transmission.

The intermediary unit includes a block of telephone number addresses (TNA's) which may be leased or purchased. These addresses, which are associated with particular subscribers, do not represent dedicated telephone lines. When used, communication is established with a "local node" by means of a DID trunk line if one is available. For long distance communication, a number of local nodes are interconnected by a digital data transmission network. At least some of the transmitting/receiving devices have unique telephone number addresses which, when used, results in telephone connection with the intermediary unit, the telephone number addresses being recorded and used by the intermediary unit to identify the receiving devices to which data is to be transmitted.

Gillon et al U.S. Pat. No. 4,922,348 is directed to communication of facsimile data. Facsimile image signals are transmitted from facsimile sources by means of simple standard user interfaces and the telephone lines. A facsimile call is set up by dialing a destination number to automatically route to data storage facilities of a switched network. Facsimile data stored in the network is transmitted to a facsimile destination. The switched network may be a private switched network, a public switched network or a private branch exchange. The network may be arranged to distribute a facsimile document to a plurality of destinations with only one transmission from any source. If the destination is unavailable, the facsimile signals can be stored until the destination becomes available.

Neudorfer Pat. No. 4,935,955 is directed to a system for interfacing central office facsimile telephone lines and internal office facsimile machines. Roll-over lines from the central office are utilized to automatically sequence up from the main facsimile telephone number as additional facsimile transmissions arrive. Incoming and outgoing facsimile transmission data is placed in memory storage after being received and before being transmitted. The combination of rollover and memory storage makes the system transparent to the outside sender, since all incoming facsimile transmissions dial the same main telephone number. Similarly, outgoing messages are transparent to the internal facsimile machine operators, since their messages are sent to the interface unit, stored in memory and then sent out over the next free facsimile telephone line.

Baran et al Pat. No. 4,893,333 describes an interactive facsimile system and method of information retrieval which permits unmodified CCITT (Consultative Committee for International Telephony and Telegraphy) Group III and IV facsimile transceivers to interactively select and retrieve facsimile pages from a shared facsimile database fax serve system. The remote facsimile transceiver user marks a paper selector sheet form using a pencil or pen. The selector sheet is transmitted via the remote facsimile transmitter to the fax server unit. The fax server unit processes the facsimile signal rapidly, interpreting the selector sheet and selecting the pages desired to be retrieved prior to the normal CCITT time out. In this way the requested information may be returned during the same telephone call. Alternatively the fax server initiates an automatic call back with the information desired. The system permits facsimile transceivers to be used as interactive terminals for selective retrieval of text and graphics, without requiring alphanumeric keyboard interaction or the need for manual intervention.

Takavama Pat. No. 4,491,873 describes a common control system for controlling a plurality of facsimile terminal apparatuses. A buffer memory is provided for storing picture data. The contents of the buffer memory is then stored in a magnetic disk memory having a large storage capacity. Contents of the disk memory are transferred to another facsimile terminal. The control system receives picture signal information from outside fax terminals. This received data is stored in a first-in, first-out (FIFO) memory, decoded and stored in a buffer memory, and thereafter transferred to a disk memory. The image signal can be retrieved from the disk memory, transferred to the buffer memory and transmitted to a designated facsimile terminal.

While various systems for providing and processing image data are available, and more are under development, the systems are not easily integrated to accommodate sharing and distribution of information between systems. Local networks interconnect workstations at a user site and gateways can be used to interface the local network with other similar systems. However, because of incompatibility between systems, interfacing between different systems is difficult or impractical. Due to initial costs of system procurement, training, and maintenance of a particular imaging or multi-media system, users are reluctant to invest in present state-of-the-art systems which may be obsolete in the near future. Still another problem with present imaging systems is unavailability of compatible image data bases. A further shortcoming of imaging systems is the relatively high start-up costs of required software and hardware.

Accordingly, an object of the invention is to provide a system providing remote centralized or distributed image processing.

Another object of the invention is to integrate users of different systems into a distributed processing system using available hardware.

Still another object of the invention is to provide automatic data routing between and among users according to scripted routing maps.

A still further object of the invention is automatic user identification for access verification and billing purposes.

DISCLOSURE OF THE INVENTION

According to one aspect of the invention, it is integrated with a telecommunications system which includes a plurality of switches interconnected by trunks, a plurality of subscriber stations arranged in groups with each group being served by one of the switching means, a plurality of subscriber lines connecting each switching means with the group of subscriber switching stations served thereby, and a switching network in each switching means for establishing communication paths between calling subscriber stations and called subscriber stations. A backbone digital data network transmits digital data using a first communications protocol. A gateway interface receives command and digital image data signals having a second communications protocol from one of the subscriber stations and converts second communications protocol of the command and digital image data signals into the first communications protocol. The gateway supplies the converted command and digital image data signals to the backbone network. The digital image data signals may include multilevel pixel intensity data to provide a graduated gray scale capability.

An image memory stores bit mapped image data as multilevel pixel density information. A processor receives the converted command and digital image data signals from the backbone network and, in response, selectively stores and retrieves the image data into and out from the image memory means over the backbone network.

According to another aspect of the invention, a real time interactive distributed image processing system includes a plurality of remote user terminal stations for inputting and processing image processing commands from a respective user. Each of the remote user terminal stations includes a local processor responsive to the image processing commands for supplying image manipulation commands and data retrieval and storage commands. An input is provided for original image data, i.e., image data prior to further processing, the image data including multilevel pixel intensity information. Each remote terminal station further includes a composite image data output for supplying composite image data, i.e., image data after manipulation, including multilevel pixel intensity information.

A central processor includes data storage connected to the central processor means for storing the original and composite image data and a graphics processor receiving the image manipulation commands from the input/output means and, in response, retrieving and combining the original image data to form the composite image data. Further associated with the central processor is a routing table memory for storing sequences of addresses, and a communications processor responsive to automatic number identification (ANI) data and to the addresses stored in the routing table for supplying the composite image data. Providing connectivity for transmitting the image manipulation commands and the data retrieval and storage commands from the remote user terminal stations to the central processor means and for transmitting the original image data and the composite image data from the central processor means to the remote user terminal station is a public switched telephone system for connecting the remote user terminal stations to the central processor means. Automatic number identification facilities are used for automatically supplying the ANI data identifying ones of the remote user terminal stations on the public switched telephone network.

Another feature of the invention includes user billing facilities for providing an indication of user system utilization including (i) storage requirements, (ii) processing usage, and (iii) input/output usage. The data storage can include short term electronic memory and long term optical memory devices. The long term optical memory device can be a write once, read many (WORM) drive.

The above and other objects, feature and advantages of the present invention will become apparent from the following description taken in conjunction with the accompanying drawings.

BEST MODE FOR CARRYING OUT THE INVENTION

The distributed imaging system provides centralized image processing to end users and access to a range of image management capabilities residing on a "shared" platform distributed through a switched telephone system. The shared platform functions as a service bureau in delivering such capabilities to end users.

The switched telephone system includes facilities for providing image and database management functionality as well as tools to build and manage user applications. The functionality is hardware/software based and is provided to end users over various network communications facilities. End users of the system maintain local equipment (i.e., workstations, scanners, etc.).

The distributed imaging system embodies an image platform based on the Client-Server model with standard communications interfaces to service multiple separate user groups accessing different applications. User groups can supply applications programs which are stored and run on the central hardware in support of respective user requirements. The image server operations are provided as functional primitives. User applications are provided by combining the primitives in a control script.

Figure 1:
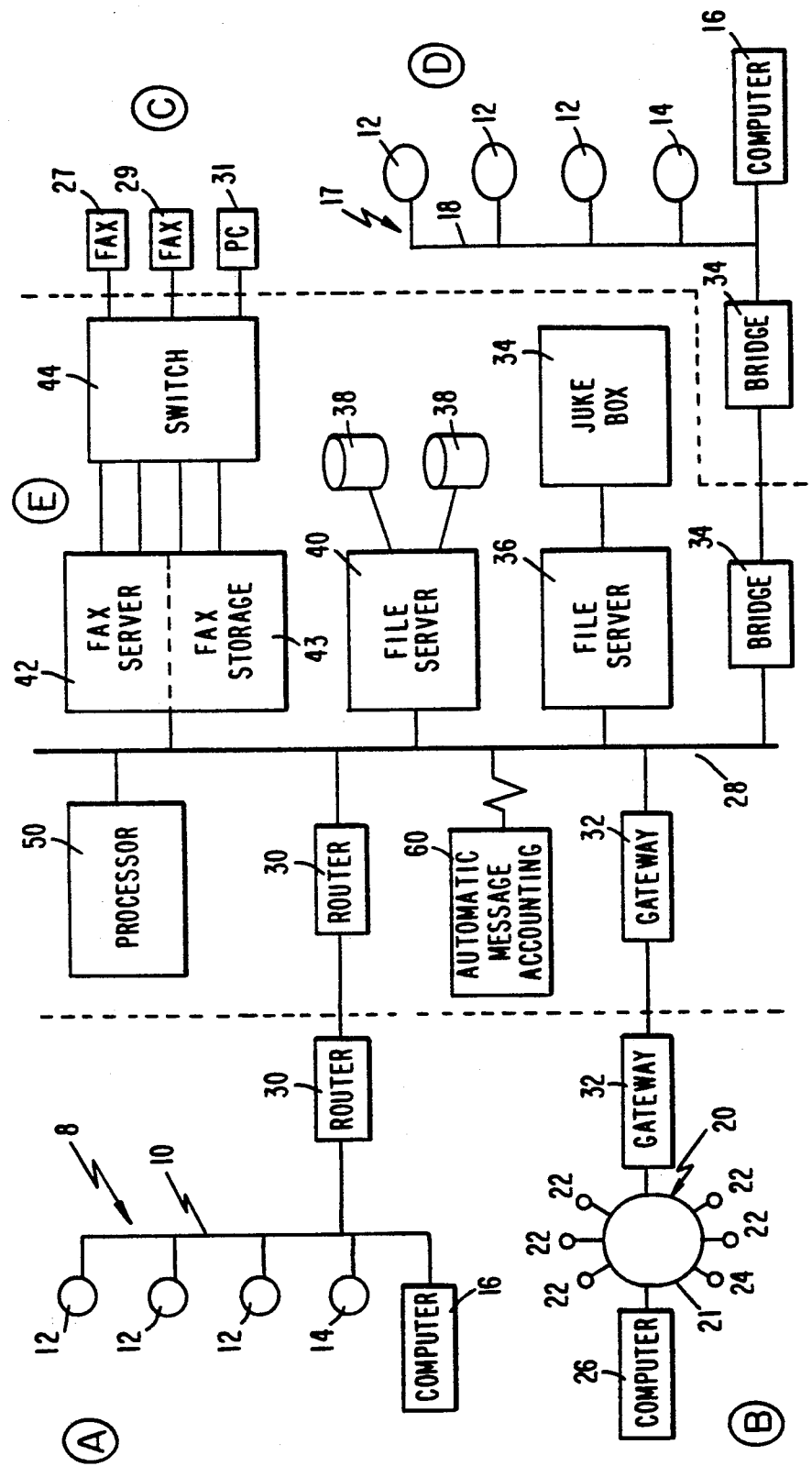
FIG. 1 is a block diagram of a distributed imaging system including user interfaces.

The distributed imaging architecture is illustrated in FIG. 1. Referring to that diagram multiple customer sites are illustrated at A, B, C and D connected to the telephone network and imaging facility at E.

Referring to the topmost site A user premise indicated generally at 8, a first user may have a local area network (LAN) 10 connecting workstations 12, a document scanner 14 and a host computer 16. A similar user premise installation 17 is illustrated at LAN 18 in the lowermost user premise site illustrated at B. The LANs can be one of several commercially available hardware and software configurations for interconnecting workstations or personal computers (PCs) with various peripherals, routers and/or gateways. ETHERNET is an example of a commercial LAN providing sufficient bandwidth for the efficient transfer of high resolution image data. Similarly, commercially available routers 30 interface LAN 10 to the central office backbone network 28 and include circuitry for performing protocol conversion between networks. Routers 30, gateways 32 and bridges 34 perform similar functions, primarily differing in the number of layers converted to interface the respective networks.

Routers 30 support one or more physical links. Upon receipt of digitized data in a packet format, the router examines the data to select the required output link. In some protocols, such as X.25, the routing decision is made at call-establishment. If the protocol does not include this information, then each packet of data is examined by router 30 to correctly route the data. The routing capability of the Public Telephone Network is functionally equivalent to routers 30.

Gateway 32 is another interconnection device which implements all seven layers of two entirely different protocol stacks. The gateway 32 functions as a multilayered protocol converter.

Routers 30 can be connected using a standard two or four wire subscriber loop to a local office at data rates of 4800 to 9600 baud. Connectivity can alternatively be provided by an ISDN or T1 link to support data transfer rates of up to 1.544 megabits per second. Using switched multi-megabit digital service (SMDS), higher data transfer rates are possible. Layered on the physical connectivity, protocols such as TCP/IP (transmission control protocol and internet protocol), ISO, SNA (systems network architecture), and SDLC (system or synchronous data link control) to provide required handshaking between routers and the respective networks.

A different LAN configuration 21 is depicted at 20 at another user premise B. This ring architecture LAN connects workstations 22, a scanner 24 and host computer 26. A still further user premise installation or plural installations are indicated at site C comprising fax machines 27 and 29 and a personal computer (PC) 31. These devices are connected through an analog or digital voice or data switch 44 and provide signals which are carried in the voice channel. The configuration at site D is essentially the same as at site A, differing in that bridges are used to interface the local area network bus 18 to backbone network 28.

The user LANs 10, 18 and 20 are respectively tied to backbone network 28 through routers 30, bridges 34 and gateways 32. The minimum hardware configuration required in order to tie into the system is a PC linked to telecommunications line capable of transmitting data to the bus 28. As discussed above, the line can be a standard class user loop supporting analog signals between approximately 300 and 3400 Hz usable at rates of up to 4800–9600 baud. Alternatively, wider bandwidth connectivity can be provided over digital transmission media to support higher data transmission rates.

The public telephone switching system installation illustrated at E includes long term storage shown as optical storage in the "jukebox" 34 tied to the bus by a file server 36. The jukebox includes a plurality of robotically changeable media such as optical disks which can be WORM (write once, read many) or erasable. The format of the optical disks includes 5¼, 10, 12 or 14 inch type platters. Alternatively, the jukebox can include a mechanism for changing and reading/writing magnetic format media such as of VCR tapes. The jukebox is intended to be for additional data storage. Data stored in the jukebox may have a high degree of data compression to maximize data storage capacity of the device.

Short term magnetic storage is provided at 38 also tied to the bus through a file server 40. The short term storage can include hard disk drives, bubble memories, solid-state disks, and other high speed access mass storage devices. The magnetic storage is used to support system virtual memory requirements and for storage of system data and programs, index information and application programs and data including image data. A fax server 42 including fax storage 43 is connected between the bus and the switch 44 connected to fax or PC terminals 27, 29 and 31.

The main processor is shown at 50 and includes an associated magnetic disk database storage (not shown) for storing system routines and data and applications programs, indices, text and images. With appropriate software, processor 50 performs system security functions as well as image data manipulation such as image cropping, scaling including image reduction and enlargement, windowing, rotation, translation, etc. Other functions supported by processor 50 can include optical character recognition, relational keyword index searching, conceptual searching, image enhancement, colorization, solarization, and combining image data with other image data and/or text data to form composite image data.

Processor 50 can also support security functions such as data encryption/decryption and electronic signature processing using, for example, the National Institute of Standards and Technology Data Encryption Standard (DES). Data encryption increases system security and further restricts unauthorized use of information transmitted to, and stored on, the backbone network. In cooperation with the respective user terminal and/or local computer, data is encrypted using a key known only to the user. The user can supply a key to decrypt data for system use if required for system performed data manipulation routines. Data decryption keys can also be supplied to destination end users to regenerate the original data.

Electronic signatures can also be supported by processor 50. Using a security key such as an electronic Personal Identification Number (PIN), a user can have the system append the user's electronic signature to a document, i.e., provide an electronic signature stamping of the document to indicate approval, authorization, or to authenticate the document. The electronic signature can be the user's PIN encrypted using the DES.

The imaging equipment supporting system functionality resides at a central facility or MOC (Minicomputer Operations Center). The short term storage receives input from the scanners and stores the data for approximately 60 days of short term storage. Beyond that the data will be automatically ported over to the long term optical storage where it remains for about a year or longer. Following that the disks are taken out of the jukebox and shelved for indefinite storage. The fax server constitutes another interface between fax machines 27 and 29 and PC 31 (generating a fax signal) and the fax server storage 43. Fax signal inputs may also come from the workstations 12 provided with fax boards. The facsimile images reconverted by the fax server into bit mapped image data and supplied to backbone network 28. Processor 50 controls bus traffic, routing the converted image data to the appropriate file server or user through the respective bridge, router or gateway equipment.

Billing is provided by automatic message accounting (AMA) equipment 60. The AMA equipment records system usage including processor, memory, and input/output processing usage of the imaging system. Appropriate bills can be generated using ANI data to identify the user.

The user hardware may comprise a range of equipment, ranging from a single PC station with a communications link as shown at site C to a complete local area networking system on the premises as shown at sites A, B and D. Such a network may have multiple PCs, servers, hosts, etc. The LAN has a communications link including protocol conversion to tie into a telecommunications line provided to tie into the centralized platform which provides a central imaging facility The hardware in the illustrated and described architecture is adapted to provide multimedia and high resolution imaging. Within that category, hardware is provided to support many services including imaging mailbox, simple storage, dial-up services such as yellow pages, image bulletin board, etc. Direct Inward Dialing (DID) availability can be provided.

The distributed imaging system provides imaging support for business and government markets, paper intensive organizations that can derive economic value from compressing the time associated with information retrieval and basic applications. The system additionally provides workflow processing and transaction processing by replacing the paper trail in an environment such as mortgage processing or insurance claim processing by routing images back and forth to people who have to otherwise work with paper. Other examples include real estate transactions, health, X-ray and medical imaging.

Original images can be anything that has gone through the scanner, i.e., the text of a letter, a picture of a house or an X-ray, etc. The scanner and imaging is faster than fax and of a better quality due to higher resolution and gray scale information. Transmission protocols for imaging are supported by increased data checking and correction of the bit mapped image data.

The distributed imaging system is capable of providing a virtual local area network for an office or business that does not have one. As one example for a law firm, the system may provide not only word processing text but database programs. All office functions may be inserted into a standardized processing form which anyone in the office can access. The law firm would purchase a program of law books and texts and provide relational searches for anything related to whatever subject is desired. Contracts may be stored and retrieved with signatures.

The virtual local area network function is supported by including address tables for each user network at the central processing facility. The virtual network may also encompass other user facilities by including appropriate routing information tables.

Figure 2:
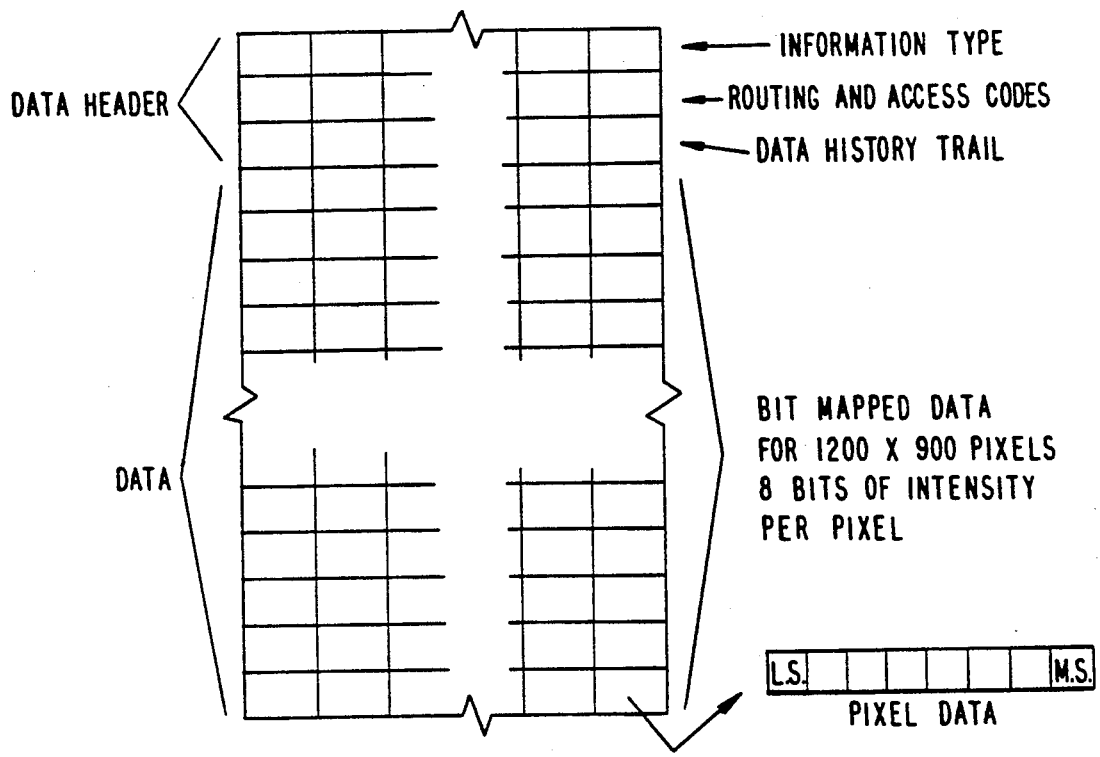
FIG. 2 is a data structure of image data including routing, access and data history fields.

Another feature of the system is the provision of automatic routing of image and text data between and among system users. Routing information is contained in data tables stored in system memory including address information and access authority. FIG. 2 depicts an image data structure including fields for data routing and access codes. For example, a first operator may scan a document to be routed through several other users for approval and addition of further information.

The routing table stored in the system may provide the required addresses to automatically assure that the proper user defined electronic document handling protocol is followed. The data table may indicate the authority of each user to modify or add to the electronic document images during processing through the virtual network. Processing may also include electronic signature of authorizing users and would maintain an electronic "paper trail" without the paper. Supervisory access would support document work processes.

Figure 3:
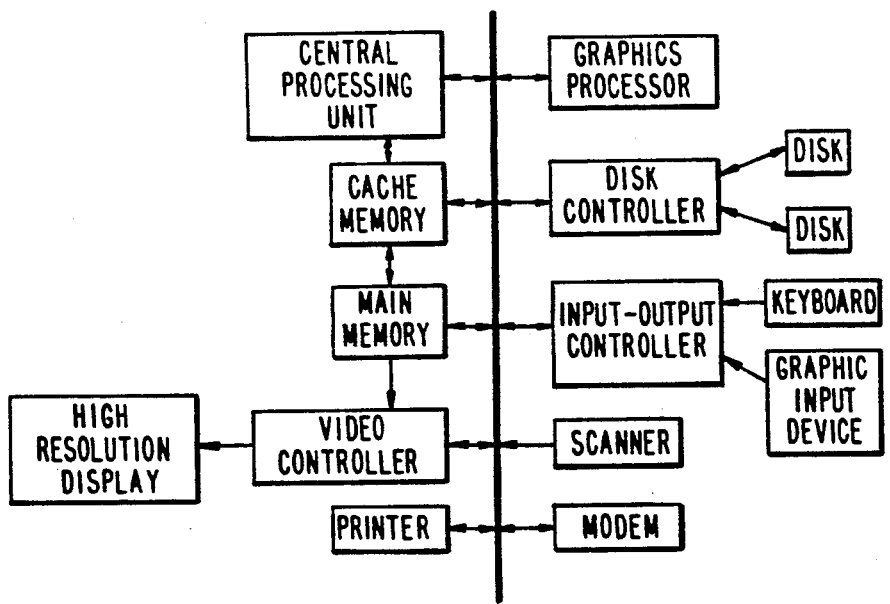
FIG. 3 is a block diagram of a typical imaging workstation.

In order to use the system, a user initiates a service request to the public telephone system using a workstation or PC. A block diagram of a multimedia imaging workstation is presented in FIG. 3. Upon acknowledgment, the user provides address and access data to establish connectivity between the user computer or network through the appropriate interfacing equipment and central backbone network to the central processor. The central processor acknowledges establishment of connectivity with the user and performs access security checking and other house keeping functions. Automatic number identification (ANI) information is provided from switching equipment to the central processor to confirm user identity and to automatically configure the system by loading appropriate interface software and parameters into respective routers and/or gateways and loading appropriate routing tables and application programs. ANI data may be used for billing purposes. In particular, charges for connect time, memory and processor usage and input/output can be recorded based on the ANI data.

Upon user identification and subsequent log-on, the user can input data from various sources such as through scanner 16 or can access image data bases using the switched public telephone system to connect to commercially available data bases. Using a workstation or PC, the user can command the system to transmit the image data to another user or users, to store and forward the data, or to hold the data for later retrieval by another user.

Data transmitted by the user can be compressed using conventional lossless or lossy data compression techniques and algorithms. In a lossless compression method data is reconstructed during decompression exactly as transmitted. Lossy compression methods use simulation techniques to approximate and regenerate data lost during compression. Compression provides for efficient storage of image and text data and improves signaling efficiency. Common compression techniques such as CCITT Group 4 may be used. Certain proprietary compression techniques may be employed to provide greater data compression.

The image data can also be manipulated under user control to provide image cropping, scaling including image reduction and enlargement, windowing, rotation, translation, etc. Other functional capabilities can be defined by user application software residing on processor 50 including image enhancement, colorization, solarization, and combining image data with other image data and/or text data to form composite image data.

Other capabilities include loading of application software for image manipulation from the user workstation or PC to central processor 50, retrieval of image history information including image access and delivery data.

The public switched telephone system described in this disclosure including a distributed imaging system provides increased process capabilities over prior art systems while maintaining compatibility with, and supporting, various user hardware and software requirements. Integrating image processing into a public switched telephone system offers increased data handling flexibility and resources while avoiding the requirement for user acquisition of expensive equipment which may not be compatible with other users.

Although the present invention has been described and illustrated in detail, it is clearly understood that the same is by way of illustration and example and is not to be taken by way of limitation, the spirit and scope of the present invention being limited only by terms of the appended claims. For example, other network configurations are possible. Hardware may be distributed throughout the public switched telephone network to obtain the advantages of a distributed processing environment. Image data can be combined with audio information to provide further enhancements to multimedia presentations.

We claim:

1. A real time interactive distributed image processing system, comprising:
   (a) a plurality of remote user terminal stations for inputting and processing image processing commands from a plurality of respective users, each of said remote user terminal stations including
      (i) local processor means responsive to said image processing commands for supplying image manipulation commands and data retrieval and storage commands,
      (ii) original image data input means for receiving image data including multilevel pixel intensity information, and
      (iii) composite image data output means for supplying composite image data including multilevel pixel intensity information;
   (b) central processor means including
      (i) data storage means connected to said central processor means for storing said original and composite image data,
      (ii) graphic processor means receiving said image manipulation commands from said local processor means and, in response, retrieving and combining said original image data to form said composite image data,
      (iii) routing table storage means for storing sequences of addresses, and
      (iv) communications processor means responsive to automatic number identification (ANI) data and to said addresses stored in said routing table for supplying said image data to said original image data input means; and
   (c) connectivity means for transmitting said image manipulation commands and said data retrieval and storage commands from said plurality of remote user terminal stations to said central processor means and for transmitting said original image data and said composite image data from said central processor means to said plurality of remote user terminal stations, said connectivity means including
      (i) a public telephone network (PTN) for connecting said plurality of remote user terminal stations to said central processor means, and
      (ii) automatic number identification means for automatically supplying said ANI data identifying each of said plurality of remote user terminal stations of said public telephone network.

2. The real time interactive distributed image processing system according to claim 1, further comprising:
   user billing means in said PTN for providing an indication of user system utilization including
      storage requirement measurement means for providing an indication of system storage used on said system storage means by said respective users of each of said plurality of remote user terminal stations;
      processing usage measurement means for recording use of said graphic processor means by each of said users; and
      input/output usage measurement means for recording use of said communications processor means by each of said users.

3. The real time interactive image processing system according to claim 1, wherein said data storage means includes short term electronic memory and long term optical memory devices.

4. The real time interactive image processing system according to claim 3, wherein said long term optical memory device comprises a write once, read many (WORM) drive.

5. The real time interactive image processing system according to claim 1, wherein said connectivity means further comprises data encryption and decryption means for encrypting and decrypting said original and composite image data.

6. The real time interactive image processing system according to claim 1, wherein said remote user terminal stations each further comprise authentication means for supplying and authenticating electronic signature data of a user.

7. The real time interactive image processing system according to claim 6, wherein said authentication means includes means for encrypting and decrypting Personal Identification Numbers of users.

* * * * *